United States Patent
Wang

(10) Patent No.: US 8,374,219 B2
(45) Date of Patent: Feb. 12, 2013

(54) BLIND SPREADING FACTOR DETECTION FOR WIDEBAND CODE DIVISION MULTIPLE ACCESS (WCDMA)

(75) Inventor: Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 614 days.

(21) Appl. No.: 12/624,152

(22) Filed: Nov. 23, 2009

(65) Prior Publication Data

US 2011/0122927 A1 May 26, 2011

(51) Int. Cl.
*H04B 1/00* (2006.01)
(52) U.S. Cl. ......................................................... 375/147
(58) Field of Classification Search .................. 375/147
See application file for complete search history.

(56) References Cited

U.S. PATENT DOCUMENTS

| | | | |
|---|---|---|---|
| 5,566,206 A * | 10/1996 | Butler et al. | 375/225 |
| 6,377,607 B1 * | 4/2002 | Ling et al. | 375/130 |
| 6,658,071 B1 * | 12/2003 | Cheng | 375/348 |
| 6,678,314 B2 * | 1/2004 | Juntti et al. | 375/150 |
| 7,006,439 B2 * | 2/2006 | Thron et al. | 370/232 |
| 7,180,932 B1 * | 2/2007 | Heinila et al. | 375/147 |
| 7,389,099 B2 | 6/2008 | Cozzo et al. | |
| 2001/0053178 A1 | 12/2001 | Yano et al. | |
| 2003/0179814 A1 * | 9/2003 | Juntti et al. | 375/148 |
| 2008/0008228 A1 * | 1/2008 | Cedergren et al. | 375/147 |
| 2008/0165904 A1 * | 7/2008 | Sidi et al. | 375/345 |
| 2008/0304554 A1 | 12/2008 | Fulghum et al. | |

FOREIGN PATENT DOCUMENTS

WO   WO 01/043330 A2   6/2001

OTHER PUBLICATIONS

Davis, E., et al., "A MAP Blind Bit-Rate Detector for Variable-Gain Multiple-Access Systems." IEEE Transactions on Communications, vol. 51, No. 6, pp. 880-884. Jun. 2003.
Juntti, M. et al., "Blind Spreading Factor Detection for DS-CDMA." Proc. IEEE Int. Symp. Personal, Indoor, Mobile Radio Communications, pp. 1395-1399. London, UK. Sep. 2000.

* cited by examiner

*Primary Examiner* — Juan A Torres

(57) ABSTRACT

In a blind spreading factor detecting receiver, the amplitude of a desired signal term is decoupled from the spreading factor hypothesis for that signal. Furthermore, the amplitude of the desired signal and the variance of an associated impairment term are estimated, and the estimates used to form a spreading factor hypothesis. Additionally, in one or more embodiments, a suboptimal detector does not rely on estimates of the amplitude of the desired signal or variance of the impairment term. Rather, the detector relies on scaled values that are partially despread using an initial spreading factor not greater than the smallest possible spreading factor used by the signal of interest, and combined using combining weights from a Rake or G-Rake processor, wherein the scaling factor is chosen to yield a unity ratio between the signal amplitude and noise variance after scaling.

14 Claims, 2 Drawing Sheets

US 8,374,219 B2

BLIND SPREADING FACTOR DETECTION FOR WIDEBAND CODE DIVISION MULTIPLE ACCESS (WCDMA)

TECHNICAL FIELD

The present invention relates generally to wireless communication and in particular to blind spreading factor detection in Wideband Code Division Multiple Access (WCDMA) transmissions.

BACKGROUND

Wideband Code Division Multiple Access (WCDMA) is a widely deployed wireless communication network access protocol. Among other applications, WCDMA is the primary air interface for the 3G Universal Mobile Telecommunications System (UMTS) technology.

Interference Cancellation is a technology being considered for uplink WCDMA to improve the performance in mixed data and voice scenarios. In interference cancellation, a high-data-rate signal is detected first. After detection, the high-data-rate signal is cancelled from the received signal, prior to the detection of low-data-rate signals such as voice. This general approach is described in U.S. Pat. No. 7,389,099, "Method and apparatus for canceling interference from high power, high data rate signals," the disclosure of which is incorporated herein by reference in its entirety.

The basic operations of interference cancellation consist of three steps. First, data bits carried in the interfering signal are detected. Next, the interference signal is regenerated at the receiver. Finally, the regenerated interfering signal is cancelled from the received signal.

The first step can be done before decoding (pre-decoding interference cancellation) or after decoding (post-decoding interference cancellation). The second step is basically to mimic how the transmitted bits arrive at the receiver. This involves going through the operations performed at the transmitter (what the transmitter has done to the data bits) and channel filtering (what the channel has done to the data bits).

Pre-decoding interference cancellation is preferable due to its lower latency. When an interfering signal uses 10 msec Transmission Time Interval (TTI) and the desired latency is on the order of a few slots, then the transport format information can not be detected via the reception of Enhanced Dedicated Physical Control Channel (E-DPCCH). This is because for 10 ms TTI (i.e. 15 WCDMA slots), an E-DPCCH message is also spread over 10 ms, which means that E-DPCCH can only be received very reliably after 10 ms. Thus, within the desired latency (a few slots) of pre-decoding interference cancellation, the transport format cannot be detected reliably through the reception of E-DPCCH. Early E-DPCCH detection is possible provided that E-DPCCH is boosted in power. However, the boosting E-DPCCH feature is not available for 10 msec TTI.

Accordingly, to perform pre-decoding interference cancellation for 10 msec TTI, the transport format (e.g., modulation, spreading factor, and number of spreading codes) must be blindly detected.

Blind spreading factor detection is known in the art, and is addressed in the IS-95 standard. For example, one known solution is to run a Viterbi decoder once for each rate (or spreading factor) hypothesis and formulate decision metrics based on the decoder outputs, as described in U.S. Pat. No. 5,566,206, "Method and apparatus for determining data rate of transmitted variable rate data in a communications receiver," incorporated herein by reference in its entirety. However, these techniques have latency of 10 msec, and thus are not suitable for the case of 10 msec TTI.

An optimal pre-decoding blind spreading factor detector is described by E. Davis, et al., in the paper titled, "A MAP blind bit-rate detector for variable-gain multiple-access systems," published in the *IEEE Trans. Commun., vol. 51*, pp. 880-884, June 2003, which is incorporated herein by reference in its entirety. Another optimal pre-decoding blind spreading factor detector, and additionally a suboptimal scheme based on the autocorrelations of partially despread values, is described by M. Juntti and K. Pajukoski in the paper titled, "Blind spreading factor detection for DS-CDMA," published in the *Proc. IEEE Int. Symp. Personal, Indoor, Mobile Radio Commun.*, pp. 1395-1399, London, U. K., September 2000, which is incorporated herein by reference in its entirety. The optimal pre-decoding blind spreading factor detection schemes described in these papers are unnecessarily complex due to their treatment about the amplitude of the desired signal term as a function of the spreading factor hypothesis. Additionally, the papers do not elaborate how to obtain key parameters necessary for the optimal detectors.

SUMMARY

According to one or more embodiments described and claimed herein, the amplitude of the desired signal term is decoupled from the spreading factor. Furthermore, the amplitude of a desired signal and the variance of an associated impairment term are estimated, and the estimates are used to form detection metrics, each associated with a spreading factor hypothesis. Additionally, in one or more embodiments, a suboptimal detector does not rely on estimates of the amplitude of the desired signal or variance of the impairment term. Rather, the detector relies on scaled values that are partially despread using an initial spreading factor not greater than the smallest possible spreading factor used by the signal of interest, and combined using combining weights from a Rake or G-Rake processor, wherein the scaling factor is chosen to yield a unity ratio between the signal amplitude and noise variance after scaling.

One embodiment relates to a method of detecting the spreading factor of a received CDMA signal. The received signal is initially despread using an initial spreading factor that is no greater than the smallest possible spreading factor used to spread the signal. The despread values are combined using combining weights generated by a Rake receiver, to generate partially despread and combined signal values. Prior to further processing, an actual spreading factor is estimated based on a most likely data bit repetition factor. The detected data symbol repetition factor is used to further combine the partially despread and combined signal values prior to decoding.

Another embodiment relates to a CDMA receiver. The receiver includes one or more antennas receiving a CDMA communication signal. The receiver also includes a despreader operative to despread the received signal using an initial spreading factor that is no greater than the smallest possible spreading factor used to spread the signal. The receiver further includes one of a Rake or G-Rake receiver operative to generate combining weights for the received signal, and a combiner operative to combine the despread values using the combining weights, and to generate a partially despread and combined signal. The receiver additionally includes a blind spreading factor detector, upstream of a decoder, operative to estimate an actual spreading factor of the received signal based on a most likely data bit repetition factor.

DETAILED DESCRIPTION

Figure 1:
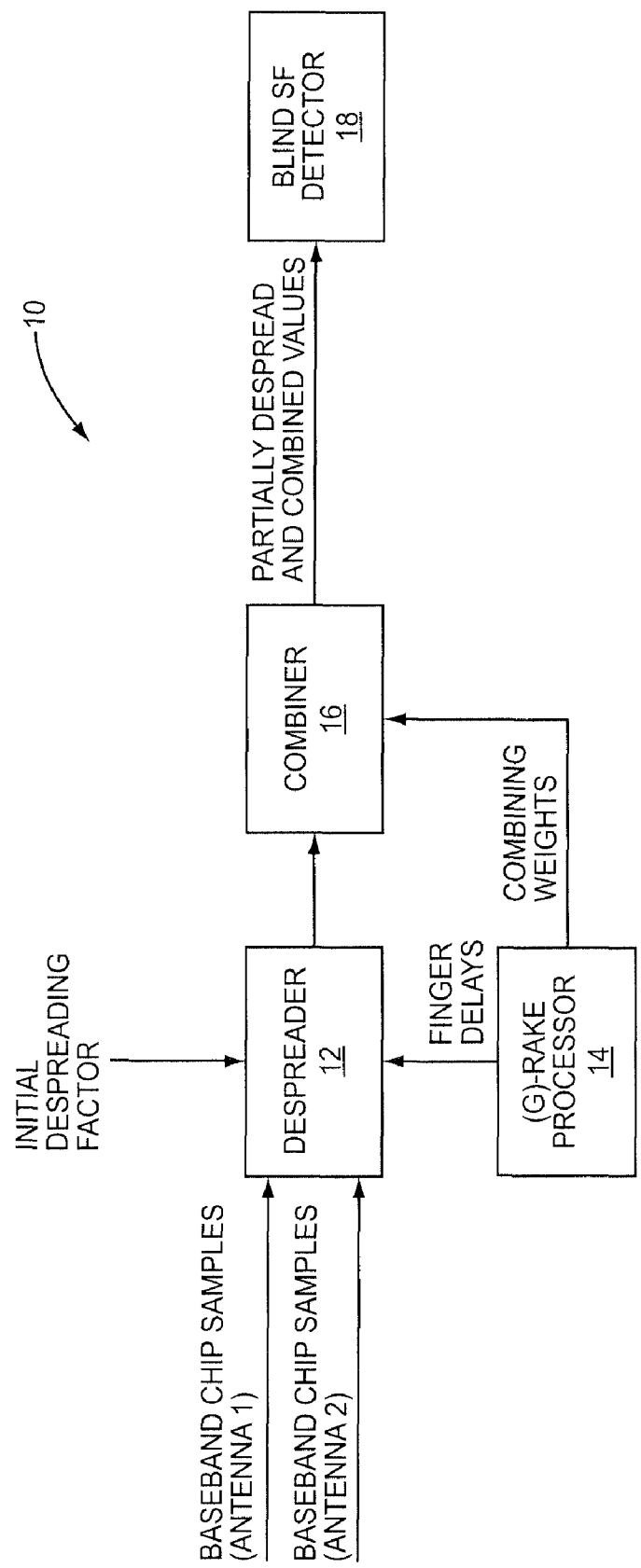
FIG. 1 is a functional block diagram of part of a receiver featuring a blind spreading factor detector operating from an initial despreading factor.

FIG. 1 depicts a portion of a blind spreading factor (SF) receiver 10. A front end (not shown) receives, low-noise amplifies, filters, downconverts, and digitizes received signals, providing baseband chip samples from a plurality of antennas. The baseband chip samples are despread by a despreader 12, using an initial despreading factor $L_0$, where $L_0$, is no greater than the smallest possible SF used by the signal of interest (e.g., the interfering signal that is being detected). For example, if the signal of interest could use SF 4, 8, or 16, according to its configuration, then $L_0$ could be 1, 2, or 4. A Rake or Generalized Rake (G-Rake) processor 14 generates finger delays and combining weights, as known in the art. A combiner 16 combines the signals despread with the initial despreading factor $L_0$, based on the combining weights from the (G)-Rake receiver 14, to generate partially despread and combined values. As used herein, the term "partially despread and combined values" refers to combined values that were despread using an initial despreading factor $L_0$ that is no larger than the actual SF used to spread the signal of interest.

The partially despread and combined value at time i are denoted as z(i):

$$z(i) = Ax(i) + u(i),$$

where x(i) is the signal component, with power $A^2$; and u(i) is the noise component, with variance $\sigma^2$.

In WCDMA uplink, SF detection can be done based on the 1st data channel (E-DPDCH$_1$), which is transmitted on the I or Q branch, depending on the configuration. In either case, the receiver can take the real or imaginary part of the complex-valued partially despread and combined values to get real-valued y(i). Without loss of generality, assume the $1^{st}$ data channel is carried in the I branch, $$y(i) = Re\{z(i)\} = Ax(i) + Re\{u(i)\} = Ax(i) + n(i). \quad (1)$$

The signal component in y(i) is $$x(i) = b\left(\left\lfloor \frac{i}{L} \right\rfloor\right),$$

where b(i) is the ith data bit; and L is the number of repetitions of a particular data bit in x(i). Assuming the initial despreading factor is $L_0$ and the true spreading factor is N, $$L = \frac{N}{L_0}.$$

Let $y = (y(0), y(1), \ldots y(K-1))^T$ be the vector of partially despread and combined values available to the detector 18. A maximum likelihood (ML) detector will detect the SF as $L_0\hat{L}$, if $p(y|\hat{L}) \geq p(y|L)$, $L \in S_L$, where $S_L$ is the set of possible repetition values. Based on p(y|L), we can formulate log-likelihood function of L as follows:

$$\Lambda(L) = -\frac{K}{2}\left(\ln(2\pi\sigma^2) + \frac{A^2}{\sigma^2}\right) + \sum_{i=0}^{K-1} \ln\cosh\left(\frac{A\sum_{l=0}^{L-1} y(Li+l)}{\sigma^2}\right). \quad (2)$$

The variance of noise can be estimated through $$\hat{\sigma}^2 = \frac{1}{2} w^H R w, \quad (3)$$

where w are the combining weights used to obtain the partially despread and combined values; and R is the impairment covariance estimate for complex-valued noise u(i). R can be obtained, for example, using unused codes as proposed in U.S. patent application Ser. No. 12/135,268, titled "Method and apparatus for estimating impairment covariance matrices using unoccupied spreading codes," filed Jun. 9, 2008, and assigned to the assignee of the present application, the disclosure of which is incorporated herein by reference in its entirety. The factor of ½ in (3) is due to the variance of real-valued noise n(i) being one half that of the complex-valued noise u(i).

The signal amplitude A can be estimated through, $$\hat{A} = w^H h \quad (4)$$

where h is the net response according to E-DPDCH$_1$ power. h can be related to the net response of the pilot carried in DPCCH $h_p$ by $$h = \beta(L) h_p. \quad (5)$$

Here, β(L) accounts for the energy difference between DPCCH and E-DPCCH$_1$. As the notation implies, this difference is a function of L, as in practice the power offset between DPCCH and E-DPDCH$_1$ depends on the data rate of E-DPDCH$_1$. As such, such a power offset will also depend on the SF.

Combining equations (4) and (5) yields, $$\hat{A}(L) = \beta(L) w^H h_p = \beta(L) A_p. \quad (6)$$

We assume that the base station has knowledge of β(L). As a result, the amplitude of the desired signal can be obtained for each hypothesis of L.

However, making A dependent on L introduces complexity in the detector 18. Alternatively, A can be estimated by other means, that can make it independent of L. As such, the first term in the log-likelihood function of equation (2) can be omitted.

Taking the magnitude square of both sides of equation (1) gives $$|y(i)|^2 = A^2 + \sigma^2.$$

Thus, an estimate of A can be obtained through $$\hat{A} = \sqrt{|y(i)|^2 - \sigma^2}. \quad (7)$$

In equation (7), the estimate of A does not depend on the hypothesis of L. With estimated signal amplitude and noise variance, and dropping out terms that do not depend on L, yields the new log-likelihood function:

$$\Lambda(L) = \sum_{i=0}^{K-1} \text{lncosh}\left(\frac{\hat{A}\sum_{l=0}^{L-1} y(Li+l)}{\hat{\sigma}^2}\right). \quad (8)$$

The L that maximizes the log-likelihood function of equation (8) will be chosen as the most likely repetition factor, $$\hat{L} = \arg\max_L \Lambda(L), \quad (9)$$

and the detected SF is thus $L_o\hat{L}$.

In one embodiment, the present invention relates to a suboptimal blind SF detector that removes the dependence on signal amplitude and noise variance from the SF detection task. In equation (8), if $$\frac{A}{\sigma^2} \approx 1,$$

then the terms associated with signal power and noise variance can be removed from the likelihood function. The partially despread and combined values may be scaled by a positive scaling factor to get $$y'(i) = \alpha y(i) = \alpha A x(i) + \alpha n(i) = A'x(i) + n'(i).$$

Note that the new amplitude in the y'(i) term is now $A' = \alpha A$ and the noise variance is $\sigma'^2 = \alpha^2 \sigma^2$. Ideally, $$\alpha = \frac{A}{\sigma^2},$$

which results in a unity ratio between the signal amplitude and noise variance after scaling. However, since the objective is to drop the requirements of the knowledge of signal power and noise variance, in practice α has to be estimated through other means.

Using the scaled partially despread and combined values y'(i) in the detector, and assuming a unity ratio between the new signal amplitude and noise variance, we can derive a new likelihood function as $$\Lambda(L) = \sum_{i=0}^{K-1} \text{lncosh}\left(\sum_{l=0}^{L-1} y'(Li+l)\right). \quad (10)$$

Furthermore, for x>>1, $$\text{lncosh}(x) = \ln\left(\frac{e^x + e^{-x}}{2}\right) \approx |x| - \ln 2. \quad (11)$$

Figure 2:
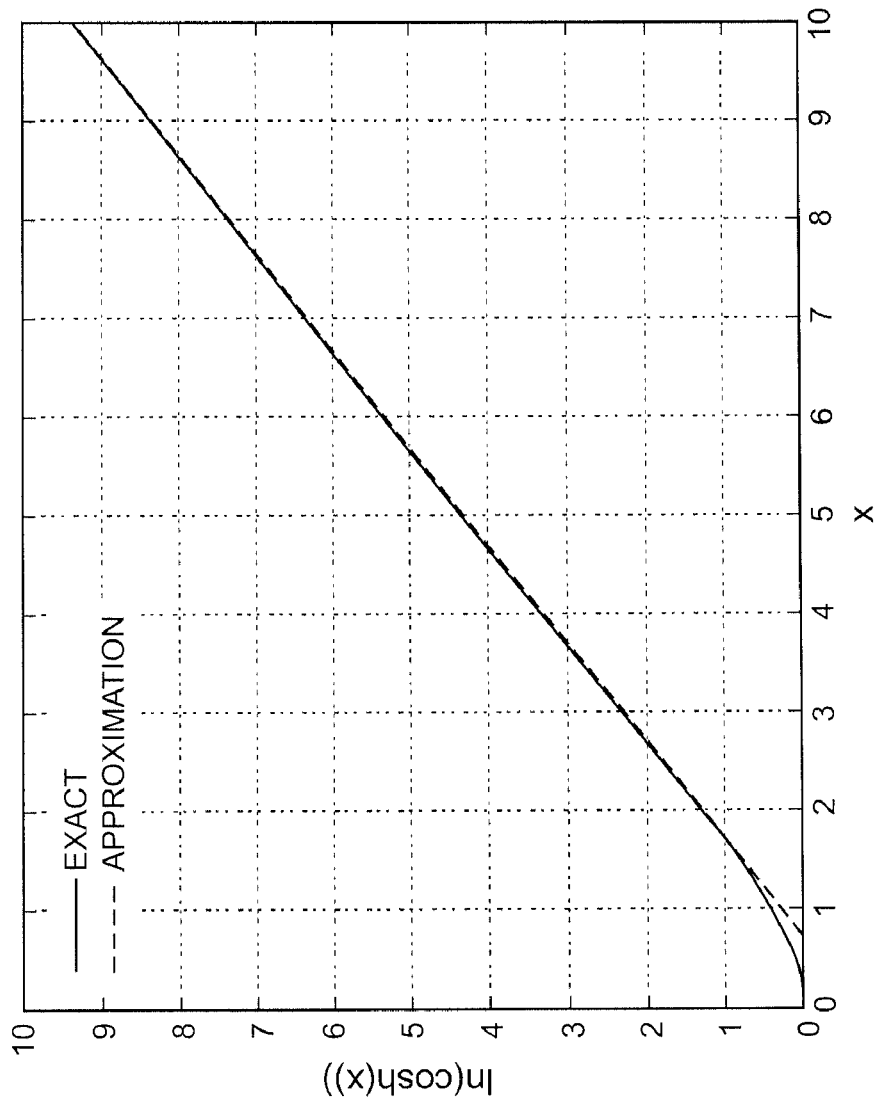
FIG. 2 is a graph of exact and approximated values for a mathematical approximation used in a repetition factor likelihood function.

The approximation of equation (11) can be further lower-bounded by 0. This approximation is illustrated in FIG. 2, which shows that the approximation is good for x>2, and relatively poor for smaller |x|. Thus, another role for the scaling factor α is to control the value of y'(i) to be in a region where the approximation in (11) yields a good detection performance. The inventors have found empirically that a good choice of α is $$\alpha = \frac{1}{E[|y(i)|]}. \quad (12)$$

Using the α of equation (12) in equation (11) yields a suboptimal detector $$\Lambda(L) = \sum_{i=0}^{K-1} \left|\sum_{l=0}^{L-1} \alpha y(Li+l)\right| - \frac{K}{L}\ln 2. \quad (13)$$

As in equation (9), the value of L that maximizes the above log-likelihood function will be chosen as the most likely repetition factor, $$\hat{L} = \arg\max_L \Lambda(L), \quad (9)$$

and the detected SF is thus $L_o\hat{L}$.

By the methods of the present invention, the SF used at the transmitter can be detected very reliably, even at low values of SINR. For example, the optimal detector can achieve 1% detection error rate at −9.7 dB $E_c/N_0$ in the flat channel, where $E_c$ is the energy per chip and $N_0$ is the one-sided noise power spectral density. When there is a 3 dB estimation error in the signal amplitude estimation, the optimal scheme achieves 1% detection error rate at −6.2 dB $E_c/N_0$ in the flat channel.

The suboptimal scheme can achieve 1% detection error rate at −7.7 dB $E_c/N_0$. By comparison, this outperforms the autocorrelation scheme proposed by Juntti and Pajukoski, cited above, which requires −5.2 dB $E_c/N_0$ to achieve 1% detection error rate.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of detecting the spreading factor of a received Code Division Multiple Access (CDMA) signal, comprising:
   initially despreading the received signal using an initial spreading factor that is no greater than the smallest possible spreading factor used to spread the signal;
   combining the despread values using combining weights generated by a Rake receiver, to generate partially despread and combined signal values; and
   prior to decoding the partially despread and combined signal, estimating an actual spreading factor based on a most likely data bit repetition factor, wherein estimating the actual spreading factor based on a most likely data bit repetition factor comprises multiplying the initial spreading factor by the most likely data bit repetition factor to estimate the actual spreading factor.

2. The method of claim 1 wherein the most likely data bit repetition factor is the data bit repetition factor that maximizes a log-likelihood function of the data bit repetition factor.

3. The method of claim 2 wherein the log-likelihood function of the data bit repetition factor is formulated using estimated signal amplitude and estimated noise variance.

4. The method of claim 2 further comprising, prior to estimating the spreading factor, scaling the partially despread and combined signal such that the ratio of signal amplitude to noise variance is substantially unity.

5. The method of claim 4 wherein the log-likelihood function is $$\Lambda(L) = \sum_{i=0}^{K-1} \ln\cosh\left(\sum_{l=0}^{L-1} y'(Li+l)\right),$$

where
- L is a data bit repetition factor; and
- y'(i) is the real-valued part of the scaled, partially despread and combined signal value at time i.

6. The method of claim 5 wherein the most likely data bit repetition factor $\hat{L}$ is the one that has the highest value of the log-likelihood function among all hypotheses.

7. The method of claim 5 wherein the log-likelihood function is determined by scaled, partially despread and combined signal values and a bias correction term.

8. The method of claim 7 wherein the scaling factor used to scale the partially despread and combined signal values is the ratio of the estimated signal amplitude to the estimated noise variance.

9. The method of claim 8 wherein the bias correction term is $$\frac{K}{L}\ln 2.$$

10. The method of claim 1 wherein the log-likelihood function of the data bit repetition factor, formulated using estimated signal amplitude and estimated noise variance is $$\Lambda(L) = \sum_{i=0}^{K-1} \ln\cosh\left(\frac{\hat{A}\sum_{l=0}^{L-1} y(Li+l)}{\hat{\sigma}^2}\right),$$

where
- L is a data bit repetition factor;
- $\hat{A}$ is the estimated signal amplitude;
- $\hat{\sigma}^2$ is the estimated noise variance; and
- y(i) is the real-valued part of the partially despread and combined signal values at time i.

11. The method of claim 10 wherein the most likely data bit repetition factor $\hat{L}$ is the one that has the highest value of the log-likelihood function among all hypotheses.

12. The method of claim 10 wherein the estimated noise variance $\hat{\sigma}^2$ is $$\hat{\sigma}^2 = \frac{1}{2}w^H R w,$$

where
- w are the combining weights used to obtain the partially despread and combined signal;
- R is an impairment covariance estimate for a complex valued noise component of the received CDMA signal.

13. The method of claim 10 wherein the estimated signal amplitude $\hat{A}$ is determined by the average power of the partially despread and combined signal values and the estimated noise variance.

14. A Code Division Multiple Access (CDMA) receiver, comprising:
- one or more antennas receiving a CDMA communication signal;
- a despreader operative to despread the received signal using an initial spreading factor that is no greater than the smallest possible spreading factor used to spread the signal;
- one of a Rake or G-Rake receiver operative to generate combining weights for the received signal;
- a combiner operative to combine the despread values using the combining weights, and to generate a partially despread and combined signal; and
- a blind spreading factor detector, upstream of a decoder, operative to estimate an actual spreading factor of the received signal based on a most likely data bit repetition factor, wherein the estimation of the actual spreading factor based on a most likely data bit repetition factor comprises multiplication of the initial spreading factor by the most likely data bit repetition factor.

* * * * *

UNITED STATES PATENT AND TRADEMARK OFFICE
CERTIFICATE OF CORRECTION

PATENT NO. : 8,374,219 B2
APPLICATION NO. : 12/624152
DATED : February 12, 2013
INVENTOR(S) : Wang It is certified that error appears in the above-identified patent and that said Letters Patent is hereby corrected as shown below:

In the Specifications

In Column 3, Line 22, delete "$L_0,$" and insert -- $L_0$ --, therefor.

In Column 5, Line 31, delete "$\sigma'^2 = \alpha^2 \alpha^2.$" and insert -- $\sigma'^2 = \alpha^2 \sigma^2.$ --, therefor.

In Column 5, Line 40, delete "a" and insert -- $\alpha$ --, therefor.

Signed and Sealed this
Fourteenth Day of May, 2013

Teresa Stanek Rea
*Acting Director of the United States Patent and Trademark Office*